United States Patent
Kuznetsov

(10) Patent No.: US 8,035,909 B2
(45) Date of Patent: Oct. 11, 2011

(54) CODING TECHNIQUE FOR CORRECTING MEDIA DEFECT-RELATED ERRORS AND RANDOM ERRORS

(75) Inventor: Alexander V. Kuznetsov, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 399 days.

(21) Appl. No.: 12/137,333

(22) Filed: Jun. 11, 2008

(65) Prior Publication Data

US 2009/0310240 A1   Dec. 17, 2009

(51) Int. Cl.
*G11B 5/09* (2006.01)

(52) U.S. Cl. ........................................................ 360/48

(58) Field of Classification Search ............... 360/53, 360/48, 54; 711/156, 170, 207; 714/42, 714/69, 780; 369/53.17, 47.33
See application file for complete search history.

(56) References Cited

U.S. PATENT DOCUMENTS

| | | | |
|---|---|---|---|
| 5,784,709 A * | 7/1998 | McLellan et al. | 711/207 |
| 5,898,491 A * | 4/1999 | Ishiguro et al. | 356/243.4 |
| 6,025,966 A * | 2/2000 | Nemazie et al. | 360/53 |
| 6,640,326 B1 * | 10/2003 | Buckingham et al. | 714/769 |
| 6,731,442 B2 | 5/2004 | Jin et al. | 360/31 |
| 6,958,961 B2 * | 10/2005 | Tsukihashi | 369/47.33 |
| 7,209,862 B2 * | 4/2007 | Taniguchi et al. | 702/183 |
| 7,296,213 B2 | 11/2007 | Vainsencher et al. | 714/784 |
| 7,386,770 B2 | 6/2008 | Takahashi | 714/710 |
| 7,444,000 B2 * | 10/2008 | Rhoads | 382/100 |
| 7,620,877 B2 * | 11/2009 | Vithanage et al. | 714/780 |
| 2008/0040645 A1 | 2/2008 | Pashenkov et al. | |
| 2008/0098050 A1 | 4/2008 | Geelen et al. | |
| 2008/0101187 A1 * | 5/2008 | Kohmoto et al. | 369/53.17 |
| 2009/0006900 A1 * | 1/2009 | Lastras-Montano et al. | 714/42 |

* cited by examiner

*Primary Examiner* — Fred Tzeng
(74) *Attorney, Agent, or Firm* — Alan G. Rego; Westman, Champlin & Kelly, P.A.

(57) ABSTRACT

A method of writing data on a storage medium that takes into account a condition of the storage medium. The method includes receiving data to be written on a portion of a storage medium and encoding the data based on a condition of the portion of the storage medium. The encoded data is written on the portion of the storage medium. A data storage system that includes a storage medium having defects is also provided. The data storage system utilizes a coding scheme that comprises coding bit patterns configured to address the defects on the storage medium.

14 Claims, 13 Drawing Sheets

CODING TECHNIQUE FOR CORRECTING MEDIA DEFECT-RELATED ERRORS AND RANDOM ERRORS

FIELD

The present aspects relate generally to error correction in data storage devices. More particularly, the present aspects relate to coding techniques for correcting media defect-related errors and random errors in data storage devices.

BACKGROUND

Data storage systems typically include storage media, supplementary electronic components, mechanical parts, software and other components. Storage media in such data storage systems can include, for example, an array of conventional solid state cells, one or more magnetic discs, one or more optical discs, or an advanced collection of nano-devices. Production of storage media is not perfect and consequently defects still remain after the storage media are produced. Such residual media defects can cause errors during operation of the data storage system.

Aspects of the present disclosure provide solutions to these and/or other problems, and offer other advantages over the prior art.

SUMMARY

In one aspect, a method of writing data on a storage medium that takes into account a condition of the storage medium is provided. The method includes receiving data to be written on a portion of a storage medium and encoding the data based on a condition of the portion of the storage medium. The encoded data is written on the portion of the storage medium. In another aspect, a data-encoding method is provided. The method includes establishing a coding scheme that comprises coding bit patterns that address different media defects on storage media. The method also includes utilizing the coding scheme to encode data prior to writing the data on the storage media. A data storage system that includes a storage medium having defects is also provided. The data storage system utilizes a coding scheme that comprises coding bit patterns configured to address the defects on the storage medium.

These and other features and benefits that characterize aspects of the present disclosure will be apparent upon reading the following detailed description and review of the associated drawings.

DETAILED DESCRIPTION

Disclosed is a scheme for coding data that takes into consideration a condition of a storage medium on which the data is to be written. More specifically, the present aspects relate to a coding scheme that addresses media defect-related errors. However, before describing the coding scheme in detail, an example of a storage device in which the coding scheme can be used will be discussed.

Figure 1:
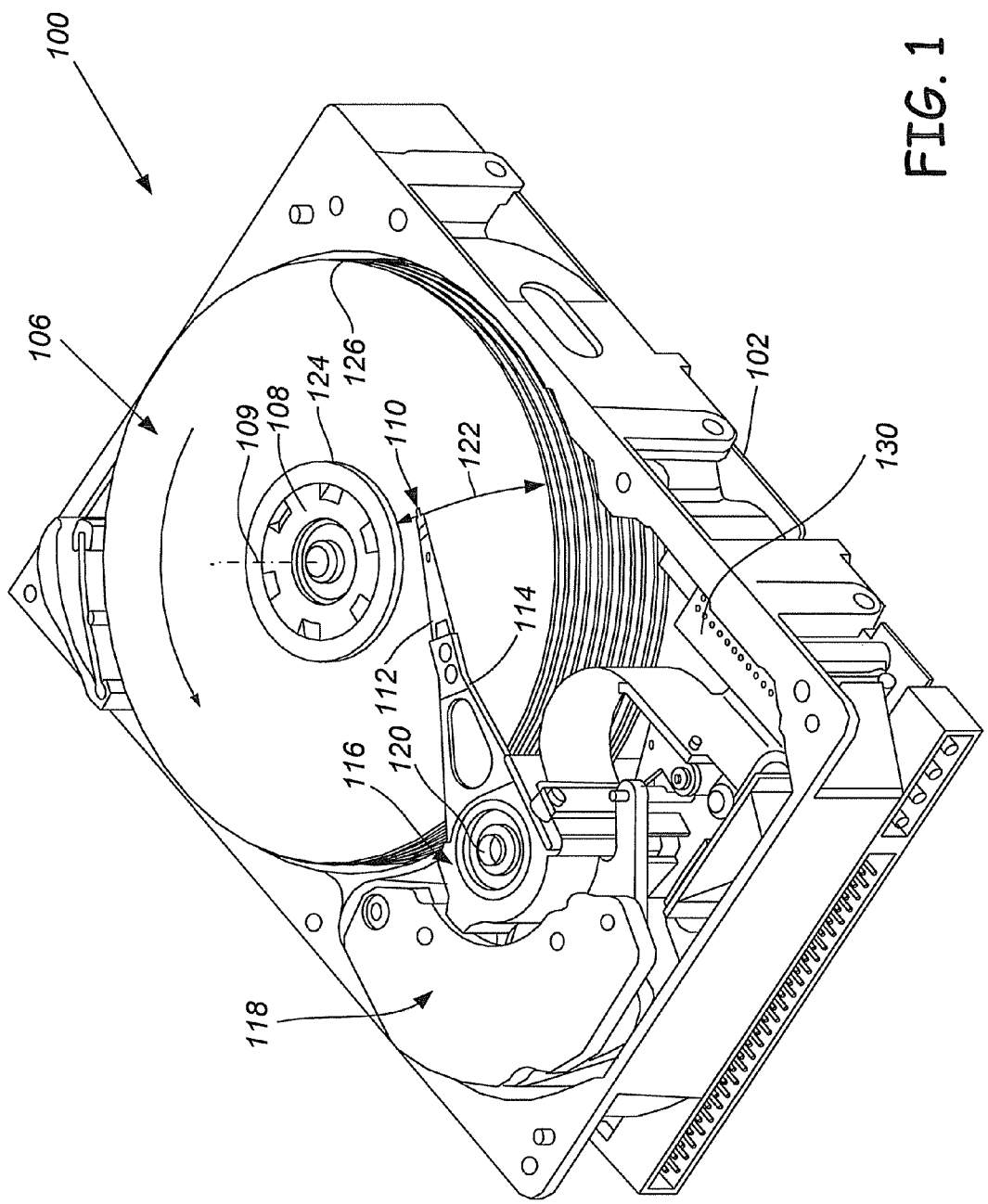
FIG. 1 is an isometric view of a disc drive in which the present aspects are useful.

Referring now to FIG. 1, an isometric view of a disc drive 100 in which the coding scheme is useful is shown. The same reference numerals are used in the various figures to represent the same or similar elements. Disc drive 100 includes a housing with a base 102 and a top cover (not shown). Disc drive 100 further includes a disc pack 106, which is mounted on a spindle motor by a disc clamp 108. Disc pack 106 includes a plurality of individual discs, which are mounted for co-rotation about central axis 109. In some aspects, instead of utilizing a disc pack, a single disc 106 is employed. Each disc surface has an associated disc head slider 110 which is mounted to disc drive 100 for communication with the disc surface. Surfaces of disc 106 are usually divided into zones, with each zone including multiple adjacent tracks. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics, which is included in control circuitry (or controller) 130, based on signals generated by heads 110 and a host computer (not shown).

Figure 2:
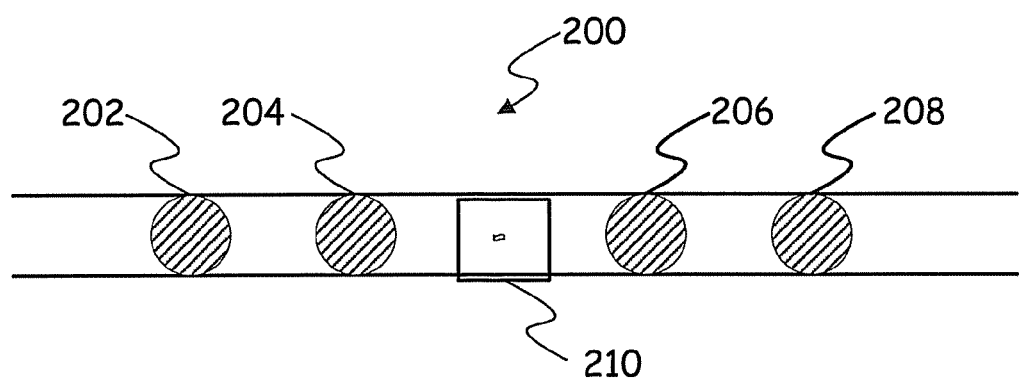
FIGS. 2 and 3 are diagrammatic illustrations that show examples of specific types of media defects.
Figure 3:
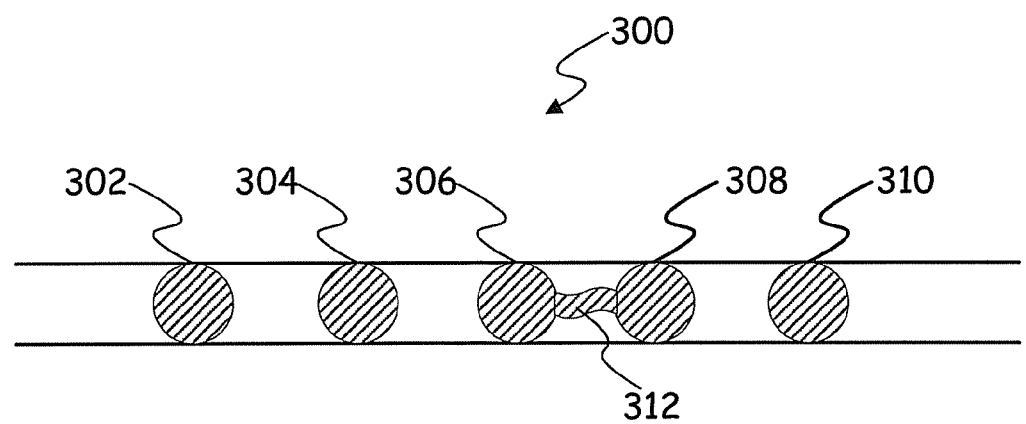

For illustrative purposes, the disc(s) 106 in disc drive 100 are considered to be magnetic bit pattern media. In magnetic bit pattern media, each bit is represented by "dot" of magnetic material. Thus, each surface of the disc(s) 106 includes multiple tracks of magnetic dots. The magnetic dots are separated by non-magnetic space and therefore are referred to as islands. As noted earlier, there will always be residual defects on storage media. In magnetic bit pattern media, the residual media defects include "missing islands" and "bridged islands." FIG. 2 is a diagrammatic illustration of a missing island on a track of a disc. Specifically, FIG. 2 shows a portion of a track 200, which includes islands 202 through 208 with a missing island (too little or no magnetic material) in section 210, which is between islands 204 and 206. FIG. 3 is a diagrammatic illustration of bridged islands. In FIG. 3, a portion of a track 300 with islands 302 through 310 is shown. A bridge 312 of magnetic material connects islands 306 and 308. As indicated above, to provide a reasonable yield for mass production of storage media and data storage devices, some such media defects need to be tolerated. However, a proper technique is needed for preventing operational errors in a storage system that can result from such residual media defects.

The present aspects address the above-noted problems by providing a solution that is based on codes that correct media defect-related errors by using predefined matching patterns or coding bit patterns. As will be apparent from the description further below, the codes that correct media-defect related errors require substantially smaller redundancy that conventional error correction codes (ECC). The description provided below also explains how the codes that correct media defect-related errors and the conventional ECC can be combined to combat both media defects and random errors.

Figure 4:
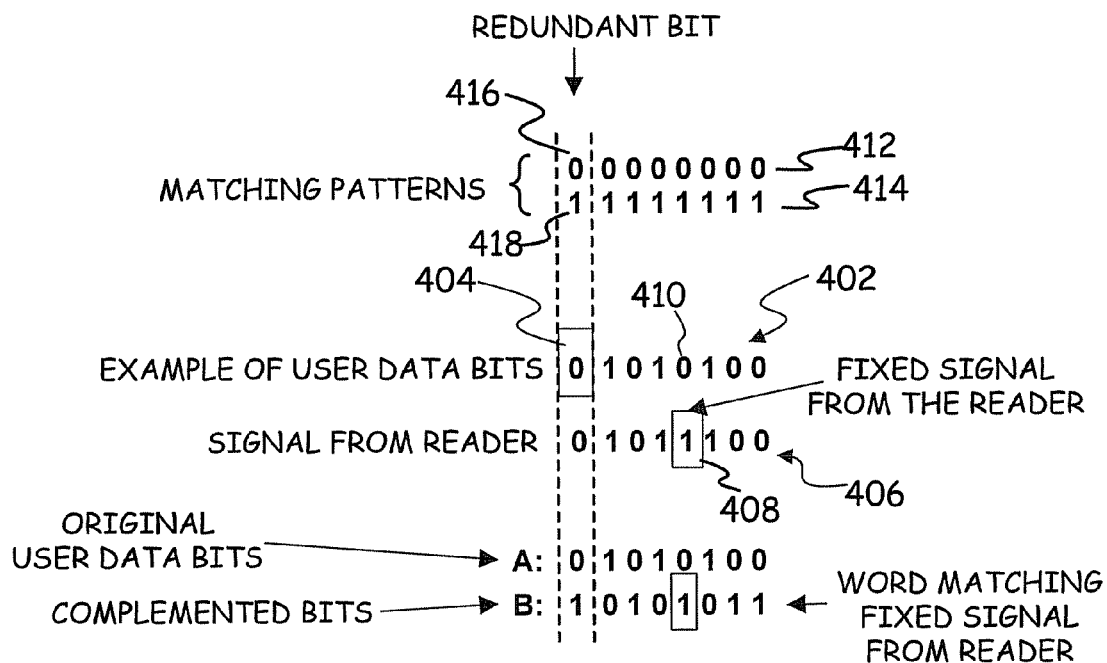
FIGS. 4 and 5 illustrate examples of how code words can be constructed and used to correct media defects shown in FIGS. 2 and 3.

FIG. 4 is an illustrative example that shows how, by using one redundant bit per code word, a mismatch of original user data and a signal from a read head (read-back signal) over a missing island can be prevented. A read-back signal from a missing island will always be zero or one, and does not depend on the written bit, i.e., it is fixed for a given defective (or missing) bit island. If the bit to be written at the position of the missing island matches the fixed read-back signal at that position, a problem does not exist. However, if the bit to be written on the missing island has an opposite value (does not match the read-back signal), storing data "as is," will result in an error during reading. As will be demonstrated below with the help of an example, such an error can be prevented during writing by complementing user data, which includes the bit to be written on the missing island, before it is written. Also, it will be seen, from the example below, that when only one island is missing, one redundant bit is required to notify the reader (for example, read head) as to whether original user data, or its complemented version, is stored.

In the example shown in FIG. 4, bit sequence 402 comprises data to be written. In sequence 402, left most bit 404 is a redundant bit and the remaining bits of bit sequence 402 are information bits. In fact, in FIG. 4, a left most bit of each bit pattern is a redundant bit. Bit sequence 406 represents bits that a read head would sense as a result of reading bit sequence 402 after it is written "as is" on a portion of a storage medium that includes a missing island at position 408, for example. Due to the missing island at position 408, a fixed read-back signal is obtained from the reader independently of what is written at that position. The example shown in FIG. 4 assumes that a "1" will always be read at position 408. In this example, bit 410 to be written on the missing island has an opposite value "0." Consequently, the read-back signal would be erroneous. As noted above, this error can be prevented by complementing the data to be written. Data is complemented with the help of matching patterns, which are selected and used in a manner described below. In the example shown in FIG. 4, a set of matching patterns that can be used includes only two patterns: one having all zeros (denoted by reference numeral 412), and another having all ones (denoted by reference numeral 414). Adding, component-wise (corresponding bits), all-zero pattern 412 to original user bit sequence 402, keeps user bits 402 unchanged. This is shown as resulting sequence A in FIG. 4. However, adding all-ones pattern 414 to user bit sequence 402 complements all its user bits. This is shown as resulting sequence B in FIG. 4. In the example of FIG. 4, alternative B is chosen as the encoded word because it eliminates the mismatch of the read-back signal from the missing island and the bit to be written at spot 408. In general, examining a redundant bit (left most bit in the example of FIG. 4) during decoding, for example, helps determine which matching pattern (code word) was used at the encoding stage.

If more than one island is missing in a span of locations at which user data has to be written, more redundant bits are need, thereby resulting in more powerful codes that correct media defect-related errors. More powerful codes that correct media defect-related errors can be described using a notion of a set of matching patterns in a manner described above. In general, to combat multiple defects, multiple matching patterns are chosen according to the dominant type(s) of defects. The multiple patterns provide multiple alternatives for code words to be written on media. Pattern identification numbers (ID), which are described below, are reproduced "as is" in an output code word, and used during decoding to identify a matching pattern used by an encoder. A pattern ID may be a prefix of a pattern, for example. In the example of FIG. 4, redundant bit 416 is the pattern ID for all-zero pattern 412. Similarly, redundant bit 418 is the pattern ID for all-ones pattern 414. In one aspect, a length of a pattern ID is proportional to the binary logarithm of, for example, a total number of matching patters. If matching patterns are identified by their prefixes of length m, then user bits must be preceded by m zeros, which are replaced by the pattern ID. These m bits determine a redundancy of the code that corrects media defect-related errors. Therefore, the smaller the number of matching patterns, the smaller the redundancy of the code.

Figure 5:
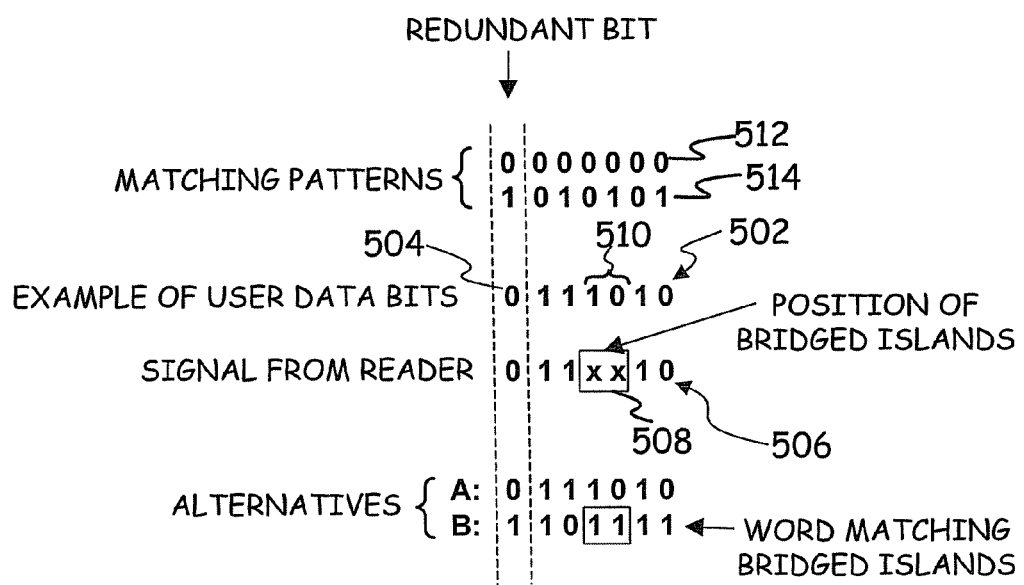

FIG. 5 is an illustrative example that shows how, again, one redundant bit per code word can be used to prevent a mismatch of original user data and a read-back signal from bridged islands. It is assumed that bridged islands act as a single island and therefore can successfully store identical bits, for example, (0,0) or (1,1), but cannot store non-identical bits such as (0,1) or (1,0). Thus, if two bits (0,0) or (1,1) are to be written at positions of a bridged island, a problem does not exist. However, if the bits to be written on the bridged islands are (0,1) or (1,0), they will be written as (0,0) or (1,1). This will result in a read error. The read error can be prevented by complementing even (or odd) data bits prior to writing. Again, as in the case of a missing island, one redundant bit is required to notify the reader whether original user data, or user data with even (or odd) bits complemented, are stored.

In the example shown in FIG. 5, bit sequence 502 comprises data to be written. In sequence 502, left most bit 504 is a redundant bit and the remaining bits are information bits. Bits sequence 506 represents bits that a reader (for example, a read head) would sense as a result of reading bit sequence 502 after it is written on a portion of a storage medium that includes bridged islands at position 508, for example. As noted above, due to the bridged islands at position 508, only identical bits, for example, (0,0) or (1,1), can be written and correctly read from that position. In the example of FIG. 5, (1,0) (denoted by reference numeral 510 in FIG. 5) has to be written in location 508 and therefore the read-back signal would be erroneous. As noted above, this error can be prevented by complementing even (or odd) bits of the data to be written. Again, as in the case of missing islands, data is complemented with the help of matching patterns. In the example shown in FIG. 5, a set of matching patterns that can be used includes only two patterns: one having all zeros (denoted by reference numeral 512), and another having even bits "0" and odd bits "1" (denoted by reference numeral 514). Adding, component-wise, all zero pattern 512 to the original user bits 502, keeps user bits 502 unchanged. This is shown as resulting sequence A in FIG. 5. However, adding pattern 514 to user bit sequence 502 complements all its odd user bits. This is shown as resulting sequence B in FIG. 5. In the example of FIG. 5, alternative B is chosen as the encoded word because it eliminates the mismatch of the read-back signal from the bridged islands and the bits to be written at spot 508. Specifically, as indicated above, a pair of bits (1,1) can be written on the bridged islands, but a pair (1,0) of alternative A cannot be written successfully on the bridged islands. As noted earlier, in general, examining a redundant bit (left most bit in the example of FIG. 5) during decoding, for example, helps determine which matching pattern (code word) was used at the encoding stage.

Figure 6:
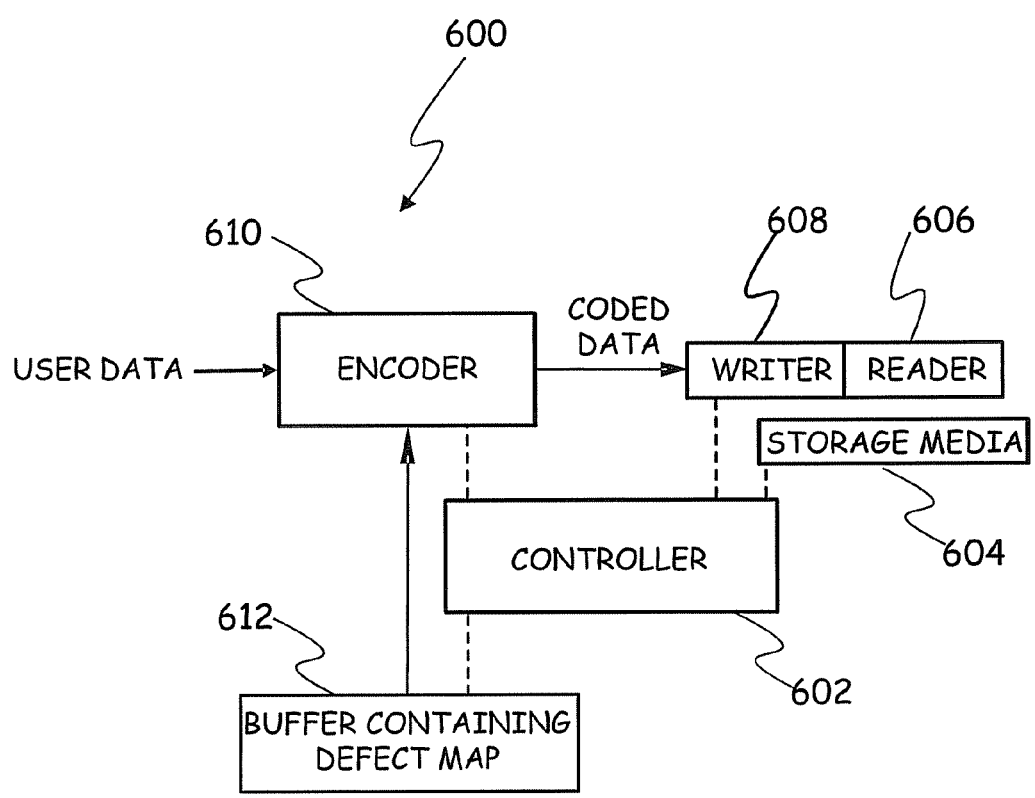
FIG. 6 is a simplified block diagram of an encoding system in accordance with one aspect.

FIG. 6 is a simplified block diagram of a data storage system 600 that employs an encoding scheme in accordance with the present aspects. System 600 includes a controller 602, one or more storage media 604, a reader 606 and a writer 608 that communicate with storage media 604, an encoder 610 and a buffer memory 612 which includes a stored defect map of media 604. Thus, in this illustration, it is assumed that positions and types of media defects are known during encoding. Of course, instead of being stored in a buffer memory as a defect map, a "read after write" technique can be employed to determine any defective locations by carrying out a read operation, on a span of locations on which data has to be written, prior to carrying out a write operation. The write operation includes an encoding process that takes into consideration any defective locations found during the read operation. It should be noted that media 608 can be any suitable data storage media such as an array of conventional solid state cells, one or more magnetic discs, one or more optical discs, or an advanced collection of nano-devices. In system 600, read operations, write operations and any coding of data associated with the read and write operations are carried out under the control of controller 602, which executes program code that may be stored in a memory internal to the controller or any suitable external memory. Also, encoder 610 can be a part of controller 602.

Figure 7:
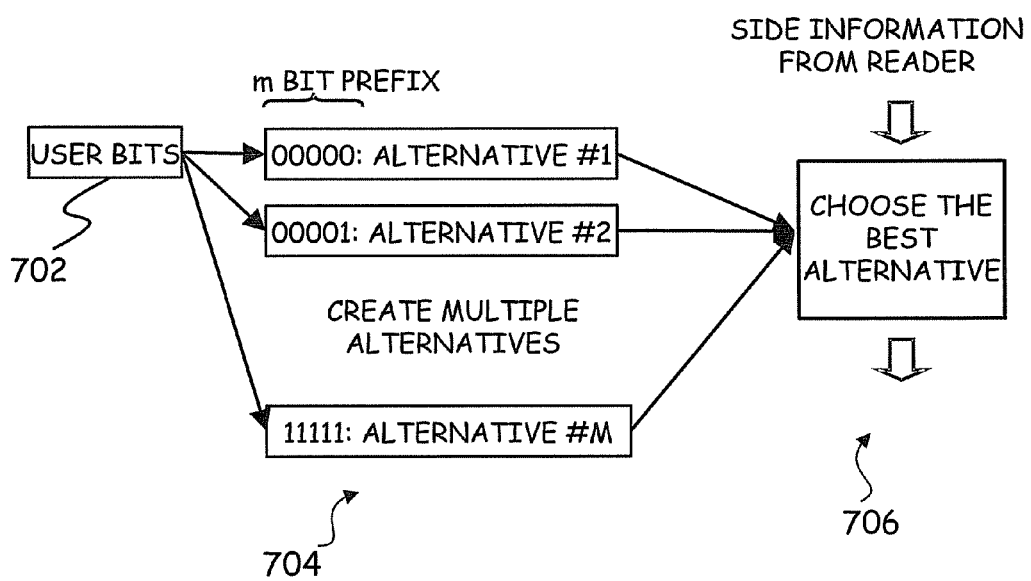
FIG. 7 is a flow diagram of an algorithm that can be used to match coded data to a type and position of a specific media defect.

FIG. 7 shows a simplified flow diagram of an algorithm which can be used to match coded data to a type and position of a specific media defect. First, user bits 702, to be written on a particular portion of a storage medium (such as 604 of FIG. 6), are converted into multiple bit sequence alternatives. This is shown in portion 704 of FIG. 7. Then, information from a reader (such as 606 of FIG. 6) regarding a condition of the particular portion of the storage medium is utilized to select a best alternative from the multiple alternatives. This is shown in portion 706 of FIG. 7. The selected alternative constitutes the encoded data that is then written on the particular position of the storage medium. As explained earlier, each alternative is prefixed by a pattern ID.

Figure 8:
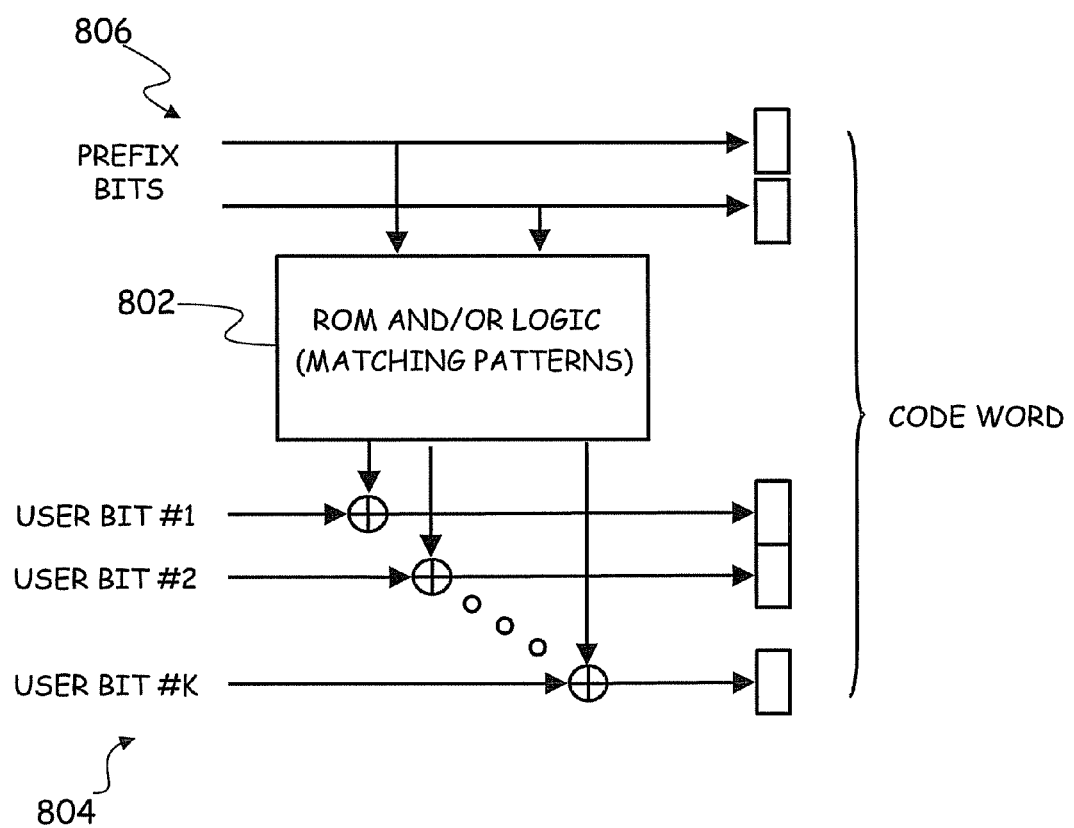
FIG. 8 is a diagrammatic illustration showing how alternative code words can be created in an additive manner.

FIG. 8 is a simplified block diagram that shows how alternative code words can be created in an additive manner. As indicated in box 802 of FIG. 8, a number of predefined patterns are used to create alternative output code words. These patterns are chosen at a design stage of a data storage device and should match a set of typical media defects. Thus, as noted earlier, the patterns are referred to as matching patterns. The matching patterns have a length k that is equal to a number of user bits 804. The matching patterns can be preceded by different prefixes of length m. As described earlier, the prefixes, which are denoted by reference numeral 806, serve as identifiers (ID) of matching patterns and alternatives used at an encoding stage. A matching pattern with its prefix is referred to as an extended matching pattern, and has a length of m+k bits. Matching patterns can be stored in read only memory (ROM) or generated by a logic circuit. It should be noted that a pattern ID need not be a prefix of a matching pattern and its position can change in different aspects.

Figure 9:
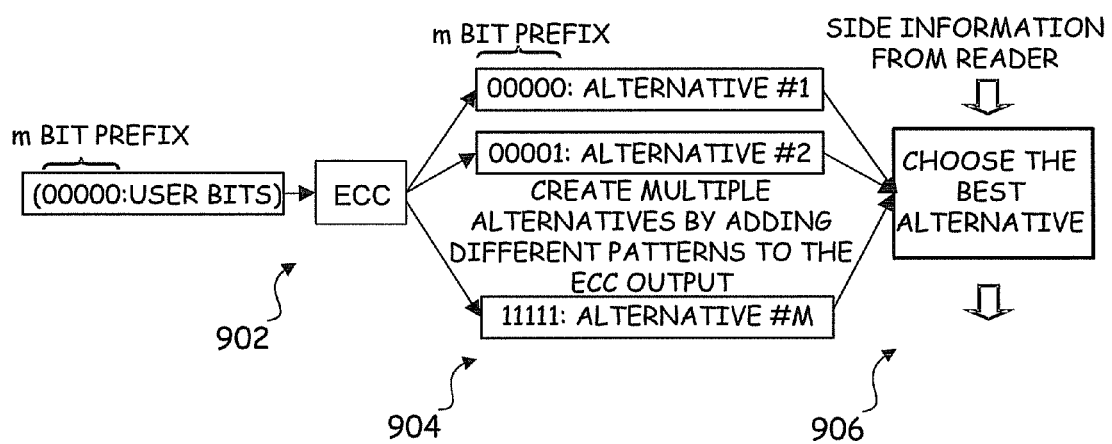
FIG. 9 is a block diagram of a method of correcting media defects and random errors.
Figure 10:
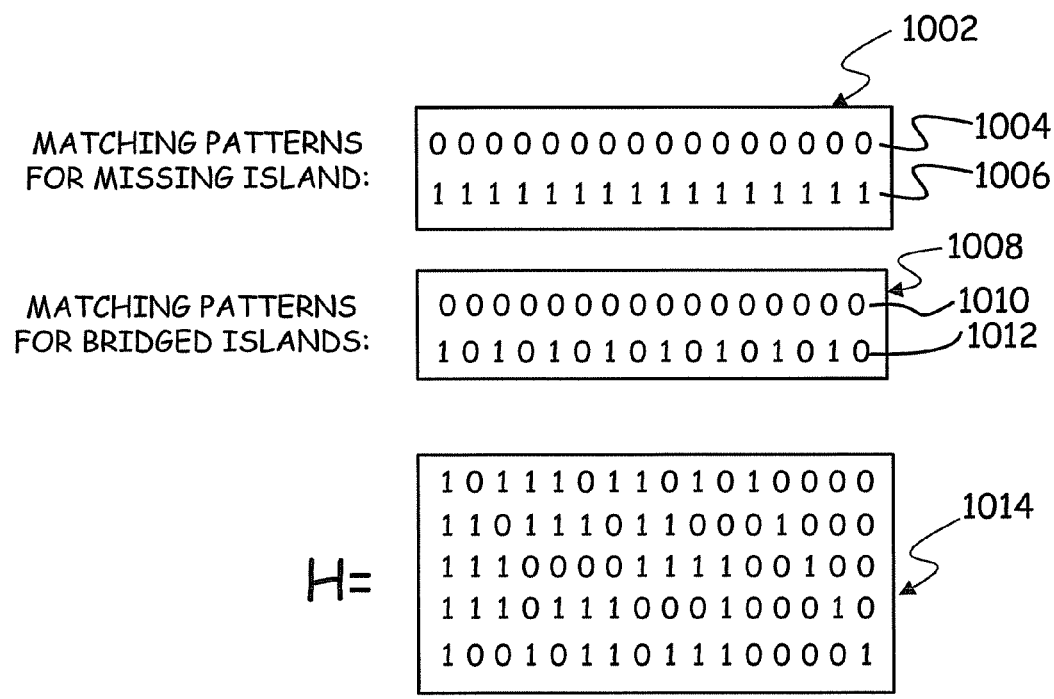
FIG. 10 is a block diagram showing matching patterns and a parity check matrix of an extended Hamming code.

As noted earlier, in accordance with one aspect, a combined solution for correcting both media defect-related errors and random errors is also provided. FIG. 9 is a block diagram of an exemplary method of correcting both media defect-related errors and random errors. As can be seen in portion 902 of FIG. 9, a set of user bits with an all zero prefix of length m is encoded using a known linear ECC code (for example, a Hamming code). Then alternative bit sequences are created, in a manner described earlier, using a set of extended matching patterns with distinct prefixes of length m. This is shown in portion 904 of FIG. 9. Then, information from a reader regarding a condition of the particular portion of the storage medium is utilized to select a best alternative from the multiple alternatives. This is shown in portion 906 of FIG. 9. The selected alternative constitutes the encoded data that is then written on the particular position of the storage medium. It should be noted that, in the example aspect shown in FIG. 9, all extended matching patterns have to belong to the ECC. Specific examples of using the combined solution for correcting both media defect-related errors and random errors are provided in connection with FIGS. 11 and 12. FIG. 10 contains data arrays used in the examples provided in FIGS. 11 and 12.

In FIG. 10, a first array 1002 and a second array 1008 constitute two sets of extended matching patterns for correction of a single missing island and a single pair of bridged islands, respectively. In both arrays a prefix length m=1 is employed and the prefix is a left most bit of each sequence in first array 1002 and second array 1008. A third array 1014 is a parity check matrix of an extended Hamming code of length 16. This code has 11 user bits, 5 parity bits, a minimum distance 4, and can detect double errors and correct single errors. As will be described below in connection with FIGS. 11 and 12, a first of 11 user bits is set to zero when this Hamming code is used to correct not only random errors but also missed or bridged islands. It is not difficult to see that all matching patterns in first array 1002 and second array 1008 belong to this Hamming code.

Figure 11:
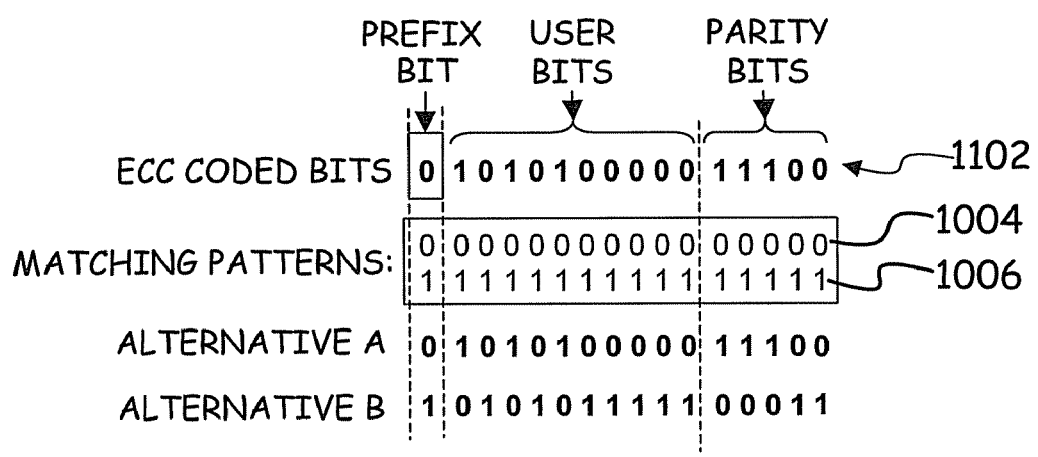
FIGS. 11 and 12 are specific examples of how media defect-related errors and random errors can be corrected on accordance with the present aspects.
Figure 12:
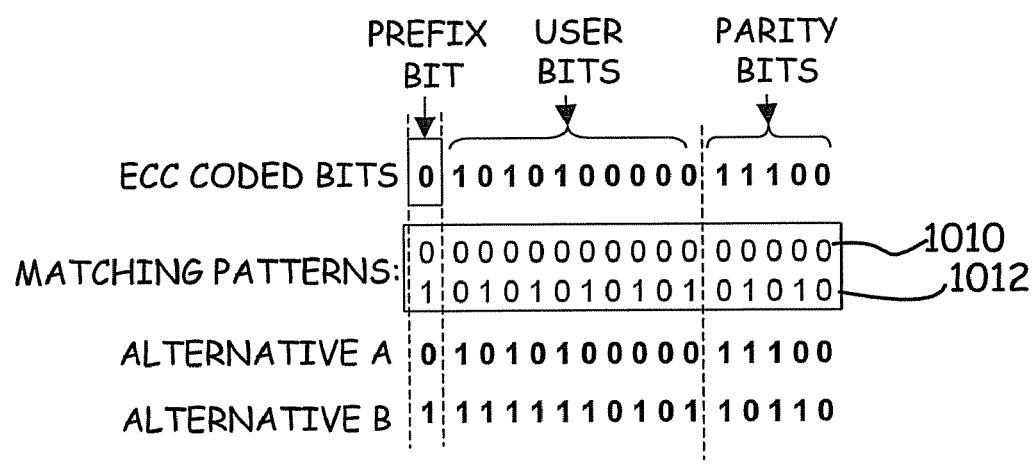

In FIG. 11, a first bit sequence 1102 includes 10 user bits preceded by a single zero and followed by 5 parity bits. When this combination of bits is added component-wise modulo 2 to a first matching pattern 1004 (of array 1002 shown in FIG. 10), alternative A is obtained in FIG. 11. Although, in this example, the first matching pattern 1004 includes all zeros, in general, the pattern could be an arbitrary predefined combination of bits. Alternative B is obtained by adding a second matching pattern 1006 to sequence 1102. Since the ECC is linear and all matching patterns belong to the ECC, both alternatives are also code words of the ECC. FIG. 12 is similar to FIG. 11 with the exception that matching patterns (1010 and 1012 of FIG. 10) are chosen in such a way that one of alternatives A or B in FIG. 12 can always be written on a pair of bridged islands.

Figure 13:
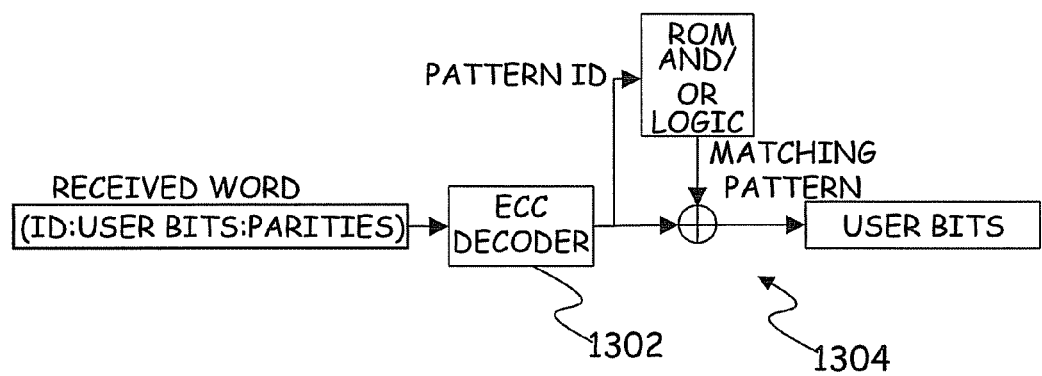
FIG. 13 is a simplified block diagram that illustrates a decoding scheme for joint media defect-related errors and random errors.

A key element of this scheme is a set of matching patterns which belongs to the linear ECC. It should be noted that, in general, a set of matching patterns is not supposed to be linear. In fact, usually, non-linear subsets of matching patterns contain fewer matching patterns, and therefore give higher code rates. However, in the present aspects, since all alternatives belong to the ECC, upon receiving a code word, random errors can first be eliminated by running ECC decoder 1302 as shown in FIG. 13. After decoding using element 1302, using the error free pattern ID, a matching pattern used during encoding is generated and original user bits are reconstructed using, for example, one or more modulo 2 adders (denoted in general by reference numeral 1304 in FIG. 13).

Figure 14:
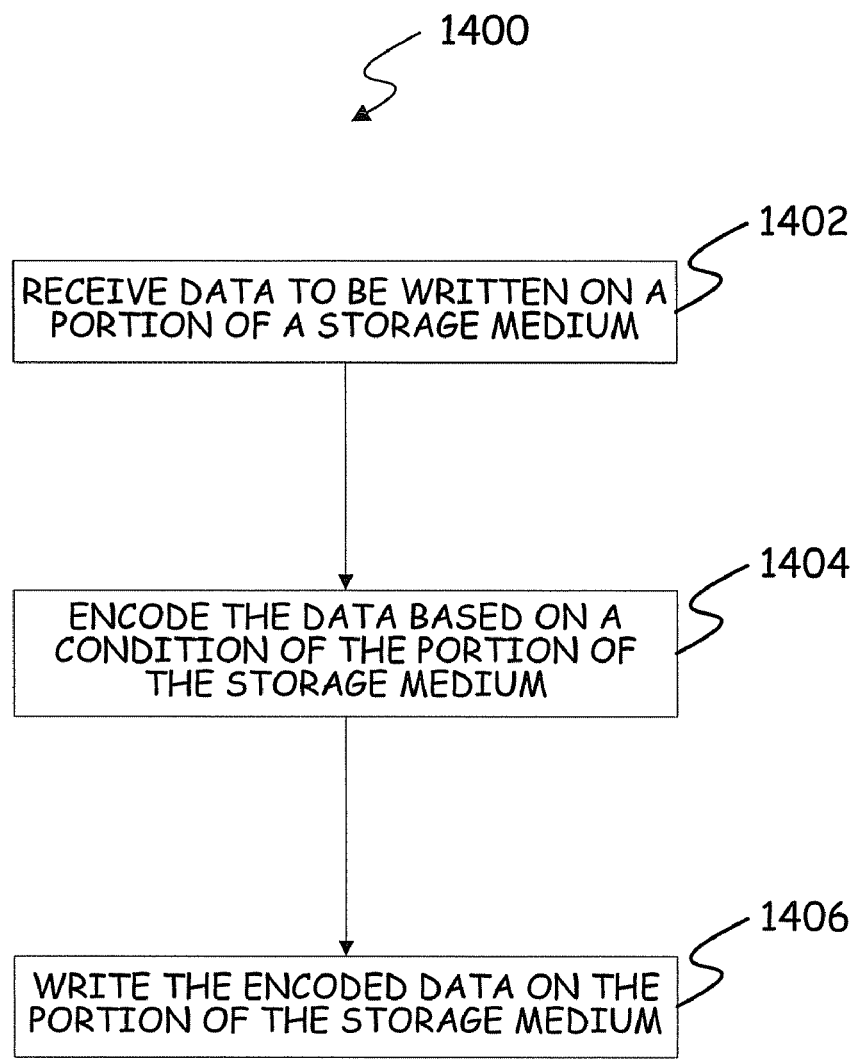
FIG. 14 is a flowchart of a method embodiment.

In conclusion, referring now to FIG. 14, a flowchart 1400 of a method of writing data on a storage medium that takes into account a condition of the storage medium is shown. A first step of the method involves receiving data to be written on a portion of the storage medium. This is illustrated at step 1402. At step 1404, data is encoded based on a condition of the portion of the storage medium. At step 1406, the encoded data is written on the portion of the storage medium. In one aspect, encoding the data based on the condition of the portion of the storage medium involves utilizing at least one predetermined coding bit pattern, selected based on information about the condition of the portion of the storage medium, to encode the data. Another aspect involves, in addition the at least one predetermined coding pattern, utilizing a coding scheme, independent of the condition of the portion of the storage medium, to encode the data.

It is to be understood that even though numerous characteristics and advantages of various aspects of the disclosure have been set forth in the foregoing description, together with details of the structure and function of various aspects of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the coding scheme while maintaining substantially the same functionality without departing from the scope and spirit of the present disclosure. In addition, although the preferred aspects described herein are directed to encoding data in a disc drive, it will be appreciated by those skilled in the art that the teachings of the present disclosure can be applied to any data storage system, without departing from the scope and spirit of the present disclosure.

What is claimed is:

1. A method comprising:
   receiving data to be written on a portion of a storage medium;
   encoding the data based on a condition of the portion of the storage medium by treating defective storage locations and non-defective data storage locations within the portion of the data storage medium as locations that are available for data storage; and
   writing the encoded data on the portion of the storage medium.

2. The method of claim 1 wherein encoding the data based on the condition of the portion of the storage medium comprises utilizing at least one predetermined coding bit pattern, selected based on information about the condition of the portion of the storage medium, to encode the data.

3. The method of claim 1 and further comprising, in addition the at least one predetermined coding pattern, utilizing a coding scheme, independent of the condition of the portion of the storage medium, to encode the data.

4. The method of claim 3 wherein the coding scheme, independent of the condition of the portion of the storage medium, is a linear coding scheme.

5. The method of claim 1 and further comprising determining the condition of the portion of the storage medium prior to encoding the data.

6. The method of claim 1 wherein determining the condition of the portion of the storage medium prior to encoding the data comprises performing a read operation on the portion of the storage medium to identify any defects prior to encoding the data.

7. The method of claim 1 wherein determining a condition of the portion of the storage medium prior to encoding the data comprises computing a defect map of the storage medium during manufacture of a storage device that includes the storage medium.

8. The method of claim 7 and further comprising reading a portion of the defect map corresponding to the portion of the storage medium prior to encoding the data.

9. A method comprising:
   implementing a coding scheme that comprises coding bit patterns configured to address different types of media defects on a storage medium, the different types of media defects being distinct categories of physical anomalies on the storage medium;
   providing a buffer memory that is capable of storing a defect map of the storage medium; and
   utilizing the coding scheme to encode data prior to writing the data on a portion of the storage medium by employing at least one coding bit pattern of the coding bit patterns, selected based on information from the defect map about a condition of the portion of the storage medium, to encode the data to be written.

10. The method of claim 9 and further comprising, in addition the at least one coding pattern, utilizing a coding scheme, independent of the condition of the portion of the storage medium, to encode the data.

11. The method of claim 10 wherein the coding scheme, independent of the condition of the portion of the storage medium, is a linear coding scheme.

12. A data storage system comprising:
   a controller configured to implement a coding scheme that comprises coding bit patterns configured to address different types of media defects on a storage medium, the different types of media defects being distinct categories of physical anomalies on the storage medium; and
   a buffer memory configured to store a defect map of the storage medium,
   wherein the controller is further configured to carry out a write operation to a portion of the storage medium by utilizing at least one coding bit pattern of the coding bit patterns, selected based on information from the defect map about a condition of the portion of the storage medium, to encode data to be written.

13. The data storage system of claim 12 and wherein the controller is further configured to, in addition to the at least one coding bit pattern, utilize a coding scheme, independent of the condition of the portion of the storage medium, to encode the data to be written.

14. The data storage system of claim 13 wherein the coding scheme, independent of the condition of the portion of the storage medium, is a linear coding scheme.

* * * * *